United States Patent
Cai et al.

(10) Patent No.: US 6,515,067 B2
(45) Date of Patent: Feb. 4, 2003

(54) OXYGEN SCAVENGING POLYMER EMULSION SUITABLE AS A COATING, AN ADHESIVE, OR A SEALANT

(75) Inventors: Gangfeng Cai, Danville, CA (US); Ta Yen Ching, Novato, CA (US); Richard Schmidt, The Woodlands, TX (US); Hu Yang, San Ramon, CA (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 09/760,609

(22) Filed: Jan. 16, 2001

(65) Prior Publication Data

US 2002/0095010 A1 Jul. 18, 2002

(51) Int. Cl.[7] .............................................. C08L 55/00
(52) U.S. Cl. ..................................... 524/553; 428/35.7
(58) Field of Search ......................................... 524/553

(56) References Cited

U.S. PATENT DOCUMENTS

| | | | |
|---|---|---|---|
| 3,497,571 A | 2/1970 | Tellier et al. | 260/844 |
| 4,293,674 A | 10/1981 | Andrews | 526/327 |
| 4,415,710 A | 11/1983 | Barnabeo et al. | 525/370 |
| 4,464,524 A * | 8/1984 | Karickhoff | 526/313 |
| 4,524,201 A | 6/1985 | Barnabeo et al. | 528/395 |
| 4,631,328 A * | 12/1986 | Ringsdorf | 526/259 |
| 4,902,460 A * | 2/1990 | Yagi | 264/83 |
| 5,021,515 A | 6/1991 | Cochran et al. | 525/371 |
| 5,116,916 A | 5/1992 | Young | 525/350 |
| 5,153,038 A | 10/1992 | Koyama et al. | 428/35.8 |
| 5,211,875 A | 5/1993 | Speer et al. | 252/188.28 |
| 5,274,024 A | 12/1993 | Koyama et al. | 524/440 |
| 5,281,360 A | 1/1994 | Hong et al. | 252/188.28 |
| 5,346,644 A | 9/1994 | Speer et al. | 252/188.28 |
| 5,356,968 A | 10/1994 | Rupaner et al. | 524/157 |
| 5,425,896 A | 6/1995 | Speer et al. | 252/188.28 |
| 5,466,756 A | 11/1995 | Roach et al. | 525/330.6 |
| 5,498,364 A | 3/1996 | Speer et al. | 252/188.28 |
| 5,547,765 A | 8/1996 | Degrassi et al. | 428/474.7 |
| 5,627,239 A | 5/1997 | Ching et al. | 525/330.6 |
| 5,631,325 A * | 5/1997 | Latiolais | 525/227 |
| 5,641,825 A | 6/1997 | Bacskai et al. | 524/398 |
| 5,656,692 A | 8/1997 | Hayes | 525/63 |
| 5,660,761 A | 8/1997 | Katsumoto et al. | 252/188.28 |
| 5,700,554 A | 12/1997 | Speer et al. | 428/220 |
| 5,707,750 A | 1/1998 | Degrassi et al. | 428/475.8 |
| 5,716,715 A | 2/1998 | Degrassi et al. | 428/475.8 |
| 5,736,616 A | 4/1998 | Ching et al. | 525/330.3 |
| 5,759,653 A | 6/1998 | Collette et al. | 428/35.9 |
| 5,763,095 A | 6/1998 | Ramesh et al. | 428/474.4 |
| 5,776,361 A | 7/1998 | Katsumoto et al. | 252/188.28 |
| 5,837,158 A | 11/1998 | Shepodd et al. | 252/181.6 |
| 5,859,145 A | 1/1999 | Ching et al. | 525/330.6 |
| 5,866,649 A | 2/1999 | Hong et al. | 524/538 |
| 6,057,013 A | 5/2000 | Ching et al. | 428/35.7 |
| 6,063,307 A | 5/2000 | Shepodd et al. | 252/181.6 |
| 6,063,417 A | 5/2000 | Paleari et al. | 426/127 |
| 6,123,901 A * | 9/2000 | Albert | 422/40 |
| 6,140,396 A * | 10/2000 | Sugioka | 524/99 |
| 6,203,923 B1 * | 3/2001 | Bansleben | 428/500 |
| 6,254,946 B1 * | 7/2001 | Hirata | 428/35.2 |
| 6,290,867 B1 * | 9/2001 | Kielbania | 252/8.61 |
| 6,290,871 B1 * | 9/2001 | Hottle | 252/188.28 |

FOREIGN PATENT DOCUMENTS

| | | |
|---|---|---|
| EP | 0 567 654 A1 | 11/1993 |
| JP | 10-265526 * | 10/1998 |
| JP | 2000212127 * | 8/2000 |
| WO | WO99/48963 | 9/1999 |
| WO | WO00/11972 | 3/2000 |
| WO | WO01/85809 | 11/2001 |
| WO | WO01/90238 | 11/2001 |
| WO | WO02/33024 | 4/2002 |
| WO | WO02/36670 | 5/2002 |

OTHER PUBLICATIONS

Ching et al., "Tasteless Oxygen Scavenging Polymers: A New Platform Technology for Food Packaging Based On Controlled Oxidation," *Oxygen Absorber . . . 2001 and Beyond*, OSP Conference, pp. 1–8 (Chicago, Jun. 19–20, 2000).

Ching et al., "Tasteless Oxygen Scavenging Polymers: A New Platform Technology for Food Packaging Based On Controlled Oxidation," *Oxygen Absorber . . . 2001 and Beyond*, OSP Conference Slides (Chicago, Jun. 19–20, 2000).

PCT/US01/47872 International Search Report (Jul. 5, 2002).

* cited by examiner

*Primary Examiner*—Paul R. Michl
(74) *Attorney, Agent, or Firm*—Williams, Morgan & Amerson, P.C.

(57) ABSTRACT

Herein is disclosed an emulsion, comprising an oxygen scavenging polymer, water, and a surfactant. The emulsion can be formed by first forming an emulsion comprising at least one monomer, water, and the surfactant, and polymerizing the monomer. Once formed, the emulsion can be used to form an oxygen scavenging packaging article by coating at least one surface of the packaging article or contacting two surfaces of the packaging article with the emulsion, and evaporating water from the emulsion-coated or -contacted surface, to form a polymer coating.

39 Claims, 3 Drawing Sheets

OXYGEN SCAVENGING POLYMER EMULSION SUITABLE AS A COATING, AN ADHESIVE, OR A SEALANT

BACKGROUND OF THE INVENTION

1. Field of the Invention

The present invention relates generally to the field of oxygen scavenging polymers. More particularly, it concerns emulsions of oxygen scavenging polymers, especially branched or partially crosslinked oxygen scavenging polymers.

2. Description of Related Art

It is well known that limiting the exposure of oxygen-sensitive products to oxygen maintains and enhances the quality and shelf-life of the product. For instance, by limiting the oxygen exposure of oxygen sensitive food products in a packaging system, the quality of the food product is maintained, and food spoilage is avoided. In addition such packaging also keeps the product in inventory longer, thereby reducing costs incurred from waste and restocking.

A growing technique for limiting oxygen exposure involves incorporating an oxygen scavenger into the packaging structure. The oxygen scavenger is typically a polymer capable of reacting irreversibly with oxygen that also provides adequate structural properties alone or as a blend in an oxygen scavenging layer of a packaging article. Many early approaches involved the use of polymers comprising linear alkenyl moieties, either in the polymer backbone or in groups pendant on the backbone, as oxygen scavengers. However, these approaches often suffered from off-taste and malodor concerns raised by the migration of fragments of the linear alkenyl moieties (generated by the scavenging reaction) into a packaged food or beverage.

A milestone in the development of oxygen scavenging polymers was reached by Ching et al., International Patent Publ. No. WO99/48963, which discloses the use of polymers comprising an ethylenic backbone and cycloalkenyl pendant groups, especially polymers comprising cycloalkenyl methyl acrylate or cycloalkenyl methyl methacrylate units, as oxygen scavenging polymers. The cycloalkenyl pendant groups do not generate fragments upon undergoing the scavenging reaction, and thus impart minimal off-taste and malodor to a packaged food or beverage.

The polymers comprising cycloalkenyl methyl (meth) acrylate disclosed by Ching et al. are typically formed by transesterification of acrylates or methacrylates by alcohols comprising the cycloalkenyl methyl moiety in a reactive extrusion process. Such techniques are effective; however, the process of producing the oxygen scavenging polymer via transesterification through reactive extrusion is expensive.

Production of polymers comprising cycloalkenyl methyl (meth)acrylate units by the free-radical-based direct polymerization of cycloalkenyl methyl (meth)acrylate monomers has not been shown. We found that free-radical-based bulk polymerization or solution polymerization of such monomers would lead to excessive crosslinking involving the double bonds of the cycloalkenyl groups. The crosslinked polymer would not be suitable to process further in the formation of an oxygen scavenging packaging article from the polymer. Also, excessive consumption of the double bonds of the cycloalkenyl groups would lower the oxygen scavenging capacity of the polymer to undesirably low levels.

Therefore, it would be desirable to have an oxygen scavenging polymer, especially one comprising cycloalkenyl pendant groups, that can be used to form an oxygen scavenging packaging article without the requirement for a solid formulation of same. Further, it would be desirable to have a free-radical based polymerization method that does not lead to excessive crosslinking of double bonds present in pendant groups, especially cycloalkenyl pendant groups. It would be further desirable that organic solvents are not required in the performance of the method.

SUMMARY OF THE INVENTION

In one embodiment, the present invention relates to a branched or crosslinked polymer. Preferably, the branched or crosslinked polymer comprises structure I:

wherein $R^1$ and $R^2$ are each selected from —H, —CH$_3$, or a monomeric unit of a polymer wherein the monomeric unit comprises an ethylenic backbone and a cyclic hydrocarbon pendant group, provided at least one of $R^1$ and $R^2$ is the monomeric unit; M is —(CR$^3_2$)$_n$—, wherein n is an integer from 0 to 4, inclusive; X is null or a linking group; and each $R^3$ is independently selected from —H or —CH$_3$.

In another embodiment, the present invention relates to an emulsion, comprising an oxygen scavenging polymer, water, and a surfactant. The oxygen scavenging polymer may be branched or crosslinked.

In still another embodiment, the present invention relates to an oxygen scavenging packaging article, comprising a structural layer and a polymer coating comprising an oxygen scavenging polymer and a surfactant. The oxygen scavenging polymer may be branched or crosslinked.

In yet a further embodiment, the present invention relates to a method for preparing an emulsion comprising an oxygen scavenging polymer, water, and a surfactant, the method comprising providing water, the surfactant, monomeric components of the oxygen scavenging polymer, and a free radical initiator; forming a first emulsion comprising water, the free radical initiator, and the surfactant; adding the monomeric components to the first emulsion; and polymerizing the monomeric components at a temperature at least about 70° C. for about 2–6 hr, to form the emulsion comprising an oxygen scavenging polymer, water, and a surfactant. The oxygen scavenging polymer may be branched or crosslinked.

In still a further embodiment, the present invention relates to a method of forming an oxygen scavenging packaging article, comprising providing a packaging article; applying an emulsion comprising an oxygen scavenging polymer, water, and a surfactant at least one surface of the packaging article, to form an emulsion-coated surface; and evaporating water from the emulsion-coated surface, to form the oxygen scavenging packaging article. The oxygen scavenging polymer may be branched or crosslinked.

In yet an additional embodiment, the present invention relates to a method of forming an oxygen scavenging packaging article comprising two adhered surfaces, comprising providing a packaging article comprising two surfaces which are desired to be adhered; applying an emulsion comprising an oxygen scavenging polymer, water, and a surfactant to at least one of the two surfaces of the packaging article, to form an emulsion-coated surface; contacting the two surfaces which are desired to be adhered; and evaporating water from the emulsion-coated surface, to adhere the two surfaces and form the oxygen scavenging packaging article. The oxygen scavenging polymer may be branched or crosslinked.

The present invention provides a formulation of an oxygen scavenging polymer other than a solid formulation. The present invention also provides a method of forming an oxygen scavenging polymer via free-radical-based polymerization. Further, organic solvent is not required in the production of the oxygen scavenging polymer.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

In one embodiment, the present invention relates to a branched or crosslinked polymer. Preferably, the branched or crosslinked polymer comprises structure I:

(I)

wherein $R^1$ and R2 are each selected from —H, —$CH_3$, or a monomeric unit of a polymer wherein the monomeric unit comprises an ethylenic backbone and a cyclic hydrocarbon pendant group, provided at least one of $R^1$ and $R^2$ is the monomeric unit; M is —$(CR^3{}_2)_n$—, wherein n is an integer from 0 to 4, inclusive; X is null or a linking group; and each $R^3$ is independently selected from —H or —$CH_3$.

Regardless of the structure of the crosslinked polymer, preferably the mole fraction of crosslinked groups is less than about 10%; more preferably, the mole fraction of crosslinked groups is less than about 1%.

In another embodiment, the present invention relates to an emulsion, comprising an oxygen scavenging polymer, water, and a surfactant. When discussing a situation wherein the emulsion has been applied to a surface, the emulsion may be termed an "applied emulsion." Thereafter, water can be removed from the emulsion, and if substantially all the water is removed the result is a "polymer coating." The mechanism by which water has been removed from the emulsion is not important. If the polymer coating is in contact with the atmosphere or a product filled within a packaging article, the polymer coating may be referred to as a "coating" or a "sealant." If the polymer coating has been applied to at least one surface of a packaging article and is in contact with at least one other surface of the packaging article, the polymer coating may be referred to as an "adhesive."

The oxygen scavenging polymer present in the emulsion can be any organic compound that irreversibly reacts with oxygen. The oxygen scavenging polymer comprises a hydrocarbon group or groups and a polymeric backbone. The hydrocarbon can be saturated or unsaturated, and substituted or unsubstituted. Examples of oxygen scavenging polymers include, but are not limited to, polymers comprising diene units such as isoprene, butadiene, or styrene-butadiene; oligomers of pentene, octene, and others prepared by olefin metathesis; diene oligomers such as squalene; and units derived from dicyclopentadiene, norbornadiene, 5-ethylidene-2-norbornene, or other monomers containing more than one carbon-carbon double bond (conjugated or non-conjugated). These oxygen scavenging polymers can further comprise carotenoids, such as β-carotene units.

Examples of substituted hydrocarbons include, but are not limited to, those with oxygen-containing moieties, such as esters, carboxylic acids, aldehydes, ethers, ketones, or alcohols. Specific examples of polymers comprising such hydrocarbons include, but are not limited to, those comprising condensation oligomeric segments derived from monomers containing carbon-carbon double bonds; unsaturated fatty acids such as oleic, ricinoleic, dehydrated ricinoleic, and linoleic acids and derivatives thereof, e.g. esters. Such hydrocarbons also include polymers or copolymers derived from allyl (meth)acrylates, or polymers containing nitrogen, such as nylon or MXD6, among others.

Preferably, the oxygen scavenging polymer comprises an ethylenic backbone and pendant or terminal cyclic olefinic group with structure II:

(II)

wherein $q_1$, $q_2$, $q_3$, $q_4$, and r are independently selected from hydrogen, methyl, or ethyl; m is —$(CH_2)_n$—, wherein n is an integer from 0 to 4, inclusive; X is null or a linking group; and, when r is hydrogen, at least one of $q_1$, $q_2$, $q_3$, and $q_4$ is also hydrogen. By "X is null" is meant that the carbon of the cyclic olefinic group adjacent to X in structure II is directly bonded to the ethylenic backbone of the polymer.

Preferably, in structure II, n is 1, and $q_1$, $q_2$, $q_3$, $q_4$, and r are each hydrogen.

In structure II, if X is not null, X is a linking group selected from:

wherein $R^4$ is hydrogen, methyl, ethyl, propyl, or butyl; and y is an integer from 1 to 18, inclusive.

Most preferably, the polymer comprises cyclohexenylmethyl acrylate (CHAA) units or cyclohexenylmethyl methacrylate (CHMA) units.

The cyclic olefinic pendant groups provide the benefit of reacting irreversibly with oxygen without the drawback of fragmentation of the pendant group often seen when non-cyclic pendant groups are used.

The polymer can be a homopolymer, a copolymer, a terpolymer, or a higher order polymer. If a copolymer, a terpolymer, or a higher order polymer is used, preferably at least about 5 mol % of the units of the polymer consist of cyclic olefinic pendant groups having structure II as described above.

If the polymer is crosslinked, preferably the polymer is lightly crosslinked (e.g. the mole fraction of crosslinked groups is less than about 10%). In one preferred embodiment, the polymer is a lightly crosslinked polymer comprising structure 1, and the mole fraction of crosslinked groups is less than about 10%, more preferably less than about 1%.

The polymer content of the emulsion can be at any desired level. The upper limit is about 67 vol %, imposed by the properties of the polymer and the surfactant. There is no lower limit imposed by the properties of the components of the emulsion, but a very low polymer content will make the formation of a solid coating from the emulsion by evaporation of the water therefrom very slow. Preferably, the polymer content of the emulsion is from about 5 wt % to about 65 wt %. More preferably, the polymer content of the emulsion is from about 20 wt % to about 65 wt %. Even more preferably, the polymer content of the emulsion is from about 20 wt % to about 50 wt %.

Depending on the method by which the emulsion is produced, there may be traces of free monomer which were not polymerized or otherwise contaminated the polymer component of the emulsion. Preferably, the emulsion comprises less than about 0.1 mol % monomer relative to the polymer (i.e. no more than 1 monomer molecule is present for every 1000 monomer units incorporated in the polymer). If the emulsion is intended for use in forming an oxygen scavenging coating of a packaging article, wherein the coating will be in contact with food, it is desirable to limit the monomer content of the emulsion to low levels (e.g. less than about 30 ppm).

The surfactant can be any surfactant which allows formation of the emulsion and does not greatly diminish the oxygen scavenging properties of the oxygen scavenging polymer after the emulsion is applied to a surface and the water evaporated from the emulsion to form a polymer coating. Also, if the emulsion is intended for use in forming an oxygen scavenging coating of a packaging article, wherein the coating will be in contact with food, the surfactant should be acceptable in this use.

In one preferred embodiment, the surfactant is an ionic surfactant. More preferably, the ionic surfactant is sodium lauryl sulfate. In another preferred embodiment, the surfactant is a nonionic surfactant. More preferably, the nonionic surfactant is nonyl phenol ethoxylate or an alkylarylpolyether sulfonate (such as Triton X-200, commercially available from Union Carbide).

Preferably, the surfactant content of the emulsion is from about 0.1 wt % to about 1.5 wt % based on the active surfactant component.

Preferably, the water of the emulsion is deionized, distilled, or both.

The emulsion can further comprise other components. The other components include those which enhance the storage or usability of the emulsion or enhance the activity of the oxygen scavenging polymer after the emulsion is applied to a surface and water evaporated therefrom.

Also, the emulsion can further comprise a water soluble initiator product. An "initiator product," as used herein, is a product formed by the breakdown of a free radical initiator used to initiate the polymerization of emulsified monomer. Preferably, the free radical initiator comprises $K_2S_2O_8$ or $(NH_4)_2S_2O_8$, i.e., the initiator generates free radicals and forms $K_2SO_4$ or $(NH_4)_2SO_4$ during the polymerization. The concentration of initiator product is preferably less than about 0.5 wt %.

A number of compounds are commonly used with oxygen scavenging polymers, in order to enhance the functionality of the oxygen scavenging polymers in storage, processing into a layer of a packaging article, or use of the packaging article. Such enhancements include, but are not limited to, limiting the rate of oxygen scavenging by the oxygen scavenging polymer prior to filling of the packaging article with a product, initiating oxygen scavenging by the oxygen scavenging polymer at a desired time, limiting the induction period (the period between initiating oxygen scavenging and scavenging of oxygen at a desired rate), improving flow characteristics, improving film forming properties, or rendering the layer comprising the oxygen scavenging polymer stronger or more transparent, among others. These compounds can be added to the emulsion, in order to enhance the oxygen scavenging functionality of the oxygen scavenging polymer. Alternatively, depending on their mechanism of action, they can be formed into a layer of a packaging article to which it will be applied the emulsion.

The emulsion or packaging article layer to which it will be applied can further comprise an oxidation catalyst, such as a transition metal. The transition metal functions to catalyze oxygen scavenging by the oxygen scavenging polymer, increasing the rate of scavenging and reducing the induction period. Though not to be bound by theory, useful transition metals include those which can readily interconvert between at least two oxidation states. See Sheldon, R. A.; Kochi, J. K.; "Metal-Catalyzed Oxidations of Organic Compounds" Academic Press, New York 1981.

Preferably, the transition metal is in the form of a salt, with the transition metal selected from the first, second or third transition series of the Periodic Table. Suitable metals include, but are not limited to, manganese, iron, cobalt, nickel, copper, rhodium, and ruthenium. The oxidation state of the metal when introduced need not necessarily be that of the active form. The metal is preferably iron, nickel, manganese, cobalt or copper; more preferably manganese or cobalt; and most preferably cobalt. Suitable counterions for the metal include, but are not limited to, chloride, acetate, oleate, stearate, palmitate, 2-ethylhexanoate, neodecanoate, or naphthenate; preferably, the counterion is selected from $C_1–C_{20}$ alkanoates. Preferably, the salt, the transition metal, and the counterion are either on the U.S. Food and Drug Administration GRAS (generally regarded as safe) list, or exhibit substantially no migration from the packaging article to the product (i.e. less than about 500 ppb, preferably less than about 50 ppb, in the product). Particularly preferable salts include cobalt oleate, cobalt stearate, cobalt 2-ethylhexanoate, and cobalt neodecanoate. The metal salt may also be an ionomer, in which case a polymeric counterion is employed. Such ionomers are well known in the art.

Typically, the amount of transition metal may range from 0.001 to 1% (10 to 10,000 ppm) of the emulsion, based on the metal content only (excluding ligands, counterions, etc.). This applies whether the transition metal is formed in the emulsion or a layer of a packaging article to which the emulsion is applied.

Another compound that can be added to the emulsion or a layer of a packaging article to which the emulsion is applied is a photoinitiator, or a blend of different photoinitiators. A photoinitiator is preferred if antioxidants are included in the emulsion to prevent premature oxidation of the oxygen scavenging polymer.

Suitable photoinitiators are well known to those skilled in the art. Specific examples include, but are not limited to, benzophenone, o-methoxybenzophenone, acetophenone, o-methoxy-acetophenone, acenaphthenequinone, methyl ethyl ketone, valerophenone, hexanophenone, α-phenyl-butyrophenone, p-morpholinopropiophenone, dibenzosuberone, 4-morpholinobenzophenone, benzoin, benzoin methyl ether, 4-o-morpholinodeoxybenzoin, p-diacetylbenzene, 4-aminobenzophenone, 4'-methoxyacetophenone, α-tetralone, 9-acetylphenanthrene, 2-acetylphenanthrene, 10-thioxanthenone, 3-acetylphenanthrene, 3-acetylindole, 9-fluorenone, 1-indanone, 1,3,5-triacetylbenzene, thioxanthen-9-one, xanthene-9-one, 7H-benz[de]anthracen-7-one, benzoin tetrahydropyranyl ether, 4,4'-bis (dimethylamino)-benzophenone, 1'-acetonaphthone, 2'-acetonaphthone, acetonaphthone and 2,3-butanedione, benz[a]anthracene-7,12-dione, 2,2-dimethoxy-2-phenylacetophenone, α,α-diethoxyacetophenone, and α,α-dibutoxyacetophenone, among others. Singlet oxygen generating photosensitizers such as Rose Bengal, methylene blue, and tetraphenyl porphine may also be employed as photoinitiators. Polymeric initiators include poly(ethylene carbon monoxide) and oligo [2-hydroxy-2-methyl-1-[4-(1-methylvinyl)phenyl]propanone].

Use of a photoinitiator is preferable because it generally (typically in combination with ultraviolet light) provides faster, more efficient, and more controllable initiation of oxygen scavenging by the oxygen scavenging polymer. However, due to the high cost of photoinitiators, it is desirable to use the minimum amount of photoinitiator required to initiate oxygen scavenging. This minimum amount will vary depending on the photoinitiator used, the wavelength and intensity of ultraviolet light used to initiate, whether the photoinitiator is present in the emulsion or a layer of a packaging article to which the emulsion is applied, and other factors. Preferably, the photoinitiator is either on the U.S. Food and Drug Administration GRAS (generally regarded as safe) list, or exhibits substantially no migration from the emulsion or the packaging article to the product (i.e. less than 50 ppb in the product).

Photoinitiators that are especially useful in the present invention include benzophenone derivatives containing at least two benzophenone moieties, as described in copending U.S. patent application Ser. No. 08/857,325, filed May 16, 1997, and hereby incorporated herein by reference. These compounds act as effective photoinitiators to initiate oxygen scavenging activity in the emulsion or the polymer coating formed from the emulsion of the present invention. Such benzophenone derivatives have a very low degree of extraction from polymeric compositions, which may lead to reduced malodor or off-taste of a packaged food, beverage, or oral pharmaceutical product by extracted photoinitiator.

A "benzophenone moiety" is a substituted or unsubstituted benzophenone group. Suitable substituents include alkyl, aryl, alkoxy, phenoxy, and alicylic groups contain from 1 to 24 carbon atoms or halides.

The benzophenone derivatives include dimers, trimers, tetramers, and oligomers of benzophenones and substituted benzophenones.

The benzophenone photoinitiators are represented by the formula:

$$A_a(B)_b$$

wherein A is a bridging group selected from sulfur; oxygen; carbonyl; —SiR''$_2$—, wherein each R'' is individually selected from alkyl groups containing from 1 to 12 carbon atoms, aryl groups containing 6 to 12 carbon atoms, or alkoxy groups containing from 1 to 12 carbon atoms; —NR'''—, wherein R''' is an alkyl group containing 1 to 12 carbon atoms, an aryl group containing 6 to 12 carbon atoms, or hydrogen; or an organic group containing from 1 to 50 carbon atoms; a is an integer from 0 to 11; B is a substituted or unsubstituted benzophenone group; and b is an integer from 2 to 12.

The bridging group A can be a divalent group, or a polyvalent group with 3 or more benzophenone moieties. The organic group, when present, can be linear, branched, cyclic (including fused or separate cyclic groups), or an arylene group (which can be a fused or no-fused polyaryl group). The organic group can contain one or more heteroatoms, such as oxygen, nitrogen, phosphorous, silicon, or sulfur, or combinations thereof Oxygen can be present as, for example, an ether, ketone, aldehyde, ester, or alcohol.

The substituents of B, herein R'', when present, are individually selected from alkyl, aryl, alkoxy, phenoxy, or alicylic groups containing from 1 to 24 carbon atoms, or halides. Each benzophenone moiety can have from 0 to 9 substituents. Substituents can be selected to render the photoinitiator more compatible with the oxygen barrier composition.

Examples of such benzophenone derivatives comprising two or more benzophenone moieties include dibenzoyl biphenyl, substituted dibenzoyl biphenyl, benzoylated terphenyl, substituted benzoylated terphenyl, tribenzoyl triphenylbenzene, substituted tribenzoyl triphenylbenzene, benzoylated styrene oligomer (a mixture of compounds containing from 2 to 12 repeating styrenic groups, comprising dibenzoylated 1,1-diphenyl ethane, dibenzoylated 1,3-diphenyl propane, dibenzoylated 1-phenyl naphthalene, dibenzoylated styrene dimer, dibenzoylated styrene trimer, and tribenzoylated styrene trimer), and substituted benzoylated styrene oligomer. Tribenzoyl triphenylbenzene and substituted tribenzoyl triphenylbenzene are especially preferred.

When a photoinitiator is used, its primary function is to enhance and facilitate the initiation of oxygen scavenging by a polymer coating comprising the oxygen scavenging polymer upon exposure to radiation. The amount of photoinitiator can vary. In many instances, the amount will depend on the oxygen scavenging polymer used, the wavelength and intensity of UV radiation used, or the nature and amount of antioxidants used, the location of the photoinitiator (in the polymer coating or in a layer of the packaging article which is coated by the polymer), as well as the type of photoinitiator used. The amount of photoinitiator also depends on the intended use of the composition. For instance, if the photoinitiator-containing component is placed underneath a layer which is somewhat opaque to the radiation used, more initiator may be needed. For most purposes, however, the amount of photoinitiator, when used, will be in the range of 0.01 to 10% by dry weight of the emulsion.

Antioxidants can be used in the emulsion or the layer of a packaging article to which the emulsion is applied to control scavenging initiation by the oxygen scavenging polymer. An antioxidant as defined herein is a material which inhibits oxidative degradation or cross-linking of polymers. Typically, antioxidants are added to facilitate the processing of polymeric materials or prolong their useful lifetime. In relation to this invention, such additives prolong the induction period for oxygen scavenging by the oxygen scavenging polymer in the absence of irradiation. When it is desired to commence oxygen scavenging by the oxygen scavenging polymer, the packaging article and the polymer coating (and any photoinitiator incorporated into either the polymer coating, the packaging article, or both) can be exposed to radiation.

Antioxidants such as 2,6-di(t-butyl)-4-methylphenol (BHT), 2,2'-methylene-bis(6-t-butyl-p-cresol), triphenylphosphite, tris-(nonylphenyl)phosphite, vitamin E, tetra-bismethylene 3-(3,5-ditertbutyl-4-hydroxyphenyl)-propionate methane, and dilaurylthiodipropionate are suitable for use with this invention.

The amount of an antioxidant which may be present may also have an effect on oxygen scavenging. As mentioned earlier, such materials are usually present to prevent oxidation or gelation of polymers. Typically, they are present in about 0.005% to 0.1% by dry weight of the emulsion. However, additional amounts of antioxidant may also be added, if desired.

Other additives which can be included in the emulsion or the layer of a packaging article to which the emulsion is applied include, but are not necessarily limited to, fillers, pigments, dyestuffs, stabilizers, processing aids, plasticizers, fire retardants, and anti-fog agents, among others.

Any other additives employed normally will not comprise more than 10% dry weight of the emulsion, with preferable amounts being less than 5% dry weight of the emulsion (whether present in the emulsion or the layer to which the emulsion is applied).

In another embodiment, the present invention relates to a method for preparing an emulsion comprising an oxygen scavenging polymer, water, and a surfactant, the method comprising (i) providing water, the surfactant, monomeric components of the oxygen scavenging polymer, and a free radical initiator; (ii) forming an emulsion comprising water, the surfactant, and the free radical initiator, to form a first emulsion; (iii) adding the monomeric components to the first emulsion, and (iv) polymerizing the monomeric components, to form the oxygen scavenging polymer emulsion.

The water and the surfactant are as described above.

The free radical initiator can be any compound known to provide free radicals in aqueous emulsion. Preferably, the free radical initiator is potassium persulfate or ammonium persulfate. The concentration of the free radical initiator is preferably less than about 0.5 wt %.

The oxygen scavenging polymer is as described above. The definition of "monomeric components" differs slightly depending on whether the oxygen scavenging polymer is a homopolymer or a copolymer, terpolymer, or higher order polymer. If the oxygen scavenging polymer is a homopolymer, "monomeric components" refers to a plurality of identical monomer molecules that, upon polymerization, form the homopolymer. For example, if the oxygen scavenging polymer is poly(cyclohexenyl methyl acrylate), the monomeric components are a plurality of cyclohexenyl methyl acrylate monomer molecules.

If the oxygen scavenging polymer is a copolymer, terpolymer, or higher order polymer, "monomeric components" refers to a plurality of first monomer molecules, a plurality of second monomer molecules, etc. (A second or subsequent monomer molecule may be referred to as a "comonomeric component"). For example, if the oxygen scavenging polymer is cyclohexenyl methyl acrylate/cyclohexenyl methyl methacrylate copolymer, the monomeric components are a plurality of cyclohexenyl methyl acrylate monomer molecules and a plurality of cyclohexenyl methyl methacrylate monomer molecules.

The emulsion comprising water, the surfactant, the monomeric components, and the free radical initiator can be prepared by adding the surfactant, the free radical initiator, and the monomeric components to the water in any order. Preferably, the order of addition is water first, the surfactant second, the free radical initiator third, and the monomeric components fourth. (After addition of the free radical initiator but before addition of the monomeric components, the composition may be referred to as a "first emulsion"). The concentration of each ingredient added to the emulsion is preferably such that the concentration in the final emulsion will be in the ranges discussed above. During or soon after addition of the surfactant and the free radical initiator to the water, the ingredients are agitated by any appropriate technique (e.g., stir bar, paddle rotor, sonication, etc.) to form the first emulsion.

After the first emulsion has been formed, monomeric components are added thereto and polymerization of the monomeric components is performed. Typically, the reactor containing the first emulsion is heated to a temperature from about 60° C. to about 100° C., preferably about 70° C., under a nitrogen atmosphere with constant stirring. The monomeric components (including any comonomeric components desired) are added thereto, either as a substantially pure feed or in a second emulsion similar to the first emulsion but with the further inclusion of the monomeric components. The substantially pure monomeric components or the second emulsion containing monomeric components is charged to the reactor sufficiently slowly to keep the temperature of the reactor below about 100° C., preferably below about 80° C.

One unexpected result of this method, when operated on monomeric components comprising cycloalkenyl moieties (e.g., monomeric components comprising structure II), is that a small degree of crosslinking may occur, preferably at cycloalkenyl moieties of the nascent polymer chains via free radical chain transfer. Preferably, if crosslinking occurs, the polymer comprises structure I. However, the degree of crosslinking is sufficiently low (typically less than about 10 mol % cycloalkenyl moieties) that the polymer emulsion may be coated onto various surfaces and form a clear film, wherein the oxygen scavenging properties of the polymer are not impaired.

After a sufficient length of time has elapsed for the reaction to go substantially to completion (preferably in the range of about 30 min to about 6 hr, more preferably about 2 hr), the temperature can be raised briefly (such as from about 10 min to about 20 min, preferably about 15 min) to at least about 90–100° C. to polymerize any residual monomeric components that may remain in the solution. Thereafter, the emulsion can be cooled with stirring to room temperature for storage or use.

The resulting emulsion is readily pourable and is stable for a period of preferably at least several months.

In another embodiment, the present invention relates to an oxygen scavenging packaging article, comprising a structural layer and a polymer coating comprising an oxygen scavenging polymer and a surfactant.

Packaging articles typically come in several forms, including a single layer flexible article, a multilayer flexible article, a single layer rigid article, or a multilayer rigid article. Typical packaging articles include plastic, glass, paper, or cardboard cartons or bottles such as juice containers, soft drink containers, beer bottles, wine bottles, thermoformed trays, or cups, which generally have wall thicknesses in the range of 100 to 1000 micrometers. Typical flexible articles include those used to package many food items, and will likely have a thickness of 5 to 250 micrometers. The walls of such articles either comprise single or multiple layers of material.

The polymer coating comprises an oxygen scavenging polymer and a surfactant as described above. It may also comprise a small amount of monomer (preferably less than about 30 ppm) and initiator product (preferably less than about 0.2 wt %). It may also comprise other additives, such as a photoinitiator, a transition metal catalyst, or an antioxidant, among others.

Alternatively, if the use of a transition metal catalyst, a photoinitiator, or another additive is desired, but addition of the additive to the emulsion is not desired, the additive can be present on the surface of the packaging article to which the emulsion comprising an oxygen scavenging polymer will later be applied. This can be accomplished by incorporating the additive into the surface layer of the packaging article, or by coating the surface of the packaging article with an emulsion or a coating comprising the additive. The emulsion comprising an oxygen scavenging polymer can then be applied to the additive-coated surface.

The polymer coating can be present on a surface of the packaging article which is in contact with filled product, i.e. can be a coating or a sealant, or it can be present between two surfaces of the packaging article, i.e. can be an adhesive.

The oxygen scavenging packaging article comprising the polymer coating can be used to package any type of product for which it is desirable to inhibit oxygen damage during storage, e.g. food, beverages, pharmaceuticals, medical products, cosmetics, corrodible metals, or electronic devices. One preferred embodiment is a glass bottle with the polymer coating present on at least a portion of the interior surface (the surface in contact with product after filling). This embodiment is especially useful for imparting a long shelf-life to oxygen-sensitive liquids such as beer or wine, given the combination of oxygen barrier properties of the glass to inhibit oxygen entry and oxygen scavenging properties of the polymer coating to scavenge oxygen present in the bottle upon filling.

The packaging article comprising the polymer coating can comprise a single structural layer or a structural layer and an additional layer or layers. The additional layers which can be used include an oxygen barrier layer, an oxygen scavenging layer, a food-contact layer, a structural layer, or an adhesive layer, alone or in any combination. Single layered packaging articles can be prepared by solvent casting, injection molding, blow molding, or by extrusion, among other techniques. Packaging articles with multiple layers are typically prepared using coextrusion, injection molding, blow molding, coating, or lamination, among other techniques.

The structural layer or layers comprise a structural polymer that imparts useful structural properties, such as rigidity, flexibility, or strength, among others, to the packaging article. Suitable structural polymers include, but are not limited to, polyethylene, low density polyethylene, very low density polyethylene, ultra-low density polyethylene, high density polyethylene, polyvinyl chloride, ethylene-vinyl acetate, ethylene-alkyl (meth)acrylates, ethylene-(meth)acrylic acid, PET, polyamides, polypropylene, or ethylene-(meth)acrylic acid ionomers. Other components that can be used in the structural layer include glass, paperboard, or cardboard. Blends of different structural polymers or components may also be used. However, the selection of the structural polymer or component largely depends on the article to be manufactured and the end use thereof. Such selection factors are well known in the art.

Preferably, the structural polymer is selected from PET, polyamides, polypropylene, polyethylene, low density polyethylene, very low density polyethylene, ultra-low density polyethylene, high density polyethylene, polyvinyl chloride, ethylene-vinyl acetate, ethylene-alkyl (meth) acrylates, ethylene-(meth)acrylic acid, or ethylene-(meth) acrylic acid ionomers. If the packaging article is a rigid carton, such as a juice carton, the structural layer preferably comprises paperboard or cardboard. If the packaging article is a bottle, the structural layer preferably comprises PET or glass.

Optionally, the packaging article comprises an oxygen barrier layer. The oxygen barrier layer comprises an oxygen barrier material, e.g. a 1 mil layer consisting essentially of the material has an oxygen transmission rate of less than about 100 cc/m$^2$/day at room temperature under 1 atm $O_2$. Preferably, the oxygen barrier material is selected from vinyl alcohol polymers, polyesters, vinylidene dichloride polymers, epoxy polymers, sulfone polymers, acrylonitrile polymers, isocyanate polymers, polyamides, silica, metal foil, or glass.

In one preferred embodiment, the oxygen barrier material is poly(ethylene/vinyl alcohol) (EVOH). In still another preferred embodiment, the oxygen barrier material is polyacrylonitrile (PAN). In a further preferred embodiment, the oxygen barrier material is poly(vinylidene dichloride) (PVDC). In yet an additional preferred embodiment, the oxygen barrier material is a polyester (such as polyethylene terephthalate (PET) or polyethylene napthalate (PEN)). In still an additional preferred embodiment, the oxygen barrier material is a polyamide. Preferred polyamides include nylon 6 and nylon 6,6.

Two or more oxygen barrier materials can be used, either as a blend of homopolymers or a copolymer of two or more materials, or, if one of the oxygen barrier materials is glass or metal foil, additional polymer oxygen barrier materials can be applied as coatings onto the glass or foil. The appropriateness of a particular oxygen barrier material may vary depending on the intended use of the packaging article and other parameters.

Further additional layers, such as adhesive layers, may also be used in the multilayer packaging article. Compositions commonly used for adhesive layers include anhydride functional polyolefins and other well-known adhesive layers. However, adhesive properties can be imparted by application of an emulsion of the present invention, so the need for a further adhesive layer may be reduced.

In another embodiment, the present invention relates to a method of forming an oxygen scavenging packaging article, comprising (i) providing a packaging article; (ii) applying an emulsion comprising an oxygen scavenging polymer, water, and a surfactant to at least one surface of the packaging article, to form an emulsion-coated surface; and (iii) evaporating water from the emulsion-coated surface, to form the oxygen scavenging packaging article.

The packaging article and the emulsion comprising the oxygen scavenging polymer, water, and the surfactant are as described above.

Applying the emulsion to the at least one surface of the packaging article can be performed by pouring the emulsion onto the surface; by immersing the surface in the emulsion; by spraying the emulsion onto the surface; or by any other technique apparent to one of ordinary skill in the art.

In one embodiment, if the use of a transition metal catalyst, a photoinitiator, or another additive with the oxygen scavenging polymer is desired, but addition of the additive to the emulsion is not desired, an emulsion or solution of the additive in water or an organic solvent, as appropriate, can be prepared, following techniques known in the art. Thereafter, the emulsion or solution comprising the additive can be applied to a surface of the packaging article to which the emulsion comprising an oxygen scavenging polymer will later be applied. Solvent can then be evaporated from the applied emulsion or solution comprising the additive, to form an additive coating on the surface. The emulsion comprising an oxygen scavenging polymer can then be applied to the additive-coated surface.

In another embodiment, the additive can be incorporated into the layer of the packaging article that will comprise the surface to which the emulsion comprising the oxygen scavenging polymer will be applied.

Evaporating water from the applied emulsion can be accomplished by any appropriate technique apparent to one of ordinary skill in the art. Such techniques include heating or passing air over the emulsion.

In another embodiment, the emulsion comprising the oxygen scavenging polymer can be used in a method of forming an oxygen scavenging packaging article comprising two adhered surfaces, comprising (i) providing a packaging article comprising two surfaces which are desired to be adhered; (ii) applying an emulsion comprising an oxygen scavenging polymer, water, and a surfactant to at least one of the two surfaces which are desired to adhered, to form at least one emulsion-coated surface; (iii) contacting the two surfaces which are desired to be adhered; and (iv) evaporating water from the at least one emulsion-coated surface, to adhere the two surfaces and form the oxygen scavenging packaging article.

The packaging article is as described above, and is typically a carton comprising paperboard or cardboard. The two surfaces which are desired to be adhered can be any two surfaces which will be in contact in the finished article.

The emulsion and its components are as described above, and can be applied as described above. At least one of the surfaces which are desired to be adhered, and optionally the other surface, receives the emulsion.

Contacting the two surfaces can be performed by the action of any appropriate apparatus on the unfinished packaging article. Evaporating water from the emulsion is as described above.

Conveniently, this method can be used in place of applying a conventional adhesive in the formation of a packaging article. The emulsion of the present invention can be applied to the packaging article in place of an adhesive during the processing of carton blanks or other unfinished packaging articles. Contacting the surfaces to be adhered, and evaporating water from the emulsion, can be performed as part of the processing of carton blanks or other unfinished packaging articles.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLES

Example 1

Preparation of CHAA Emulsion Homopolymer

To a 500 mL beaker with 200 mL of deionized water were added in sequence 24 g Triton X-200 (surfactant from Union Carbide), 0.4 g ammonium persulfate, and 200 g CHAA. The contents were thoroughly mixed to form a monomer emulsion. A 1-L 3-neck flask fitted with a magnetic stirrer, a thermometer, a reflux condenser, and an additional funnel, was charged with 250 mL of deionized water, 24 g Triton X-200 and 0.4 g ammonium persulfate. With constant stirring, the solution was warmed to 80° C. From the addition funnel, 50 g monomer emulsion was added all at once. Once the polymerization of this portion of the monomer had subsided, the remaining monomer was added at a constant rate such that the temperature remains about 80–85° C. (in about 1 hr). After the addition had been completed and the reaction temperature had subsided in about one hour, the temperature was raised briefly (15 min) to 100° C. to complete the polymerization of residual monomer. The emulsion or latex was then cooled, with stirring, to room temperature and poured into a 1-L bottle. This emulsion contained about 28.5 wt. % CHAA polymer.

Example 2

Preparation of CHAA/CHMA Emulsion Copolymer

Similar to Example 1, 100 g CHAA and 100 g CHMA were used in place of 200 g CHAA. The remaining procedures were the same. The final emulsion was a copolymer with 50 wt. % CHAA and 50 wt. % CHMA. This emulsion contained about 28.5 wt. % CHAA/CHMA copolymer.

Example 3

Preparation of CHAA/Methyl Acrylate Emulsion Copolymer

Similar to Example 1, 100 g CHAA and 100 g methyl acrylate were used instead of 200 g CHAA. The remaining procedures were the same. The final emulsion was a copolymer with 50 wt. % CHAA and 50 wt. % methyl acrylate. This emulsion contained about 28.5 wt. % CHAA/methyl acrylate copolymer.

Example 4

Preparation of CHAA/Methyl Acrylate Emulsion Copolymer

Similar to Example 1, 10 g CHAA and 90 g methyl acrylate were used instead of 200 g CHAA. The weights of water, Triton X-200, ammonium persulfate were each one-half of those used in Example 1. The remaining procedures were the same. The final emulsion was a copolymer with 10 wt. % CHAA and 90 wt. % methyl acrylate. This emulsion contained about 28.5 wt. % CHAA/methyl acrylate copolymer.

Example 5

Preparation of CHAA/Methyl Acrylate Emulsion Copolymer

Similar to Example 1, 2 g CHAA and 98 g methyl acrylate were used instead of 200 g CHAA. The weights of water, Triton X-200, ammonium persulfate were each one-half of those used in Example 1. The remaining procedures were the same. The final emulsion was a copolymer with 2 wt. % CHAA and 98 wt. % methyl acrylate. This emulsion contained about 28.5 wt. % CHAA/methyl acrylate copolymer.

Example 6

Preparation of CHMA Emulsion Homopolymer

Similar to Example 1, 100 g CHMA was used instead of 200 g CHAA. The weights of water, Triton X-200, ammonium persulfate were each one-half of those used in Example 1. The remaining procedures were the same. This emulsion contained about 28.5 wt. % CHMA homopolymer.

Example 7

Preparation of CHAA/Methyl Acrylate Emulsion Copolymer

Similar to Example 1, 25 g CHAA and 75 g methyl acrylate were used instead of 200 g CHAA. The weights of Triton X-200, ammonium persulfate were each one-half of those used in Example 1. A total of 100 g water was used. The remaining procedures were the same. The final emulsion was a copolymer with 25 wt. % CHAA and 75 wt. % methyl acrylate. This emulsion contained about 40.0 wt. % CHAA/methyl acrylate copolymer.

Example 8

Preparation of CHAA/Methyl Acrylate Emulsion Copolymer

Similar to Example 1, 75 g CHAA and 25 g methyl acrylate were used instead of 200 g CHAA. The weights of Triton X-200, ammonium persulfate were each one-half of those used in Example 1. A total of 80 g water was used. The remaining procedures were the same. The final emulsion was a copolymer with 75 wt. % CHAA and 25 wt. % methyl acrylate. This emulsion contained about 50.0 wt. % CHAA/ methyl acrylate copolymer.

Example 9

Preparation of CHAA/Methyl Methacrylate Emulsion Copolymer

Similar to Example 1, 10 g CHAA and 90 g methyl methacrylate were used to replace 200 g CHAA. The weights of water and ammonium persulfate were each one-half of those used in Example 1. A total of 16 g Triton X-200 was used. The remaining procedures were the same. The final emulsion was a copolymer with 10 wt. % CHAA and 90 wt. % methyl methacrylate. This emulsion contained about 28.5 wt. % CHAA/methyl methacrylate copolymer.

Example 10

Preparation of CHAA/Methyl Acrylate/Acrylic Acid Emulsion Copolymer

A 2-L 4-neck flask fitted with a mechanical stirrer, a thermometer, a reflux condenser, nitrogen sparge, and two additional funnels, was charged with 476 parts deionized water, 32 parts sodium lauryl sulfate (containing 28–30% active surfactant) and 1 part $(NH_4)_2S_2O_8$. With constant stirring, the solution was warmed to 70° C. In a second flask, 213 parts CHAA and 213 parts methyl acrylate were mixed with 9 parts acrylic acid and poured into one of the additional funnels of the 2-L flask. In a third flask, 45 parts deionized water were mixed with 2 parts $K_2S_2O_8$ and poured into the other additional funnel of the 2-L flask. About 20% of the monomer mixture was added quickly into the reaction flask and allowed to react. When the exotherm subsided, addition of the remaining monomer mixture and the initiator solution was begun. Both the monomer mixture and initiator solution were added separately and concurrently over a period of 1–2 hr (depending on the actual scale). The reaction mixture was maintained at 70–75° C. during the reaction, and for 1–2 hr after completion of the feeds. A mixture containing 6 parts deionized water and ammonia (28%) was poured into the reaction mixture. The emulsion product was cooled and discharged. This emulsion contained 43.7% copolymer solid.

Example 11

Preparation of CHAA/Vinyl Acetate Emulsion Copolymer

A 2-L 4-neck flask fitted with a mechanical stirrer, a thermometer, a reflux condenser, a nitrogen sparge, and two additional funnels, was charged with 267 parts deionized water, 3 parts sodium lauryl sulfate (containing 28–30% active surfactant) and 1 part $K_2S_2O_8$. With constant stirring and nitrogen sparge, the solution was warmed to 65° C. In a second container, 250 parts deionized water, 6 parts sodium lauryl sulfate, 1 part $K_2S_2O_8$, 223 parts CHAA, and 223 parts vinyl acetate were mixed with strong agitation to form a monomer emulsion. First, 20% of the monomer emulsion was added to the reaction flask. The rest of the monomer emulsion was added slowly after the polymerization started and returned to 65° C. after the exotherm. The addition rate was controlled to make sure the reaction mixture did not exceed 70° C. After the addition was completed, the reaction mixture was stirred for 4 hr. The emulsion product was cooled and discharged. This emulsion contained 44.6% of copolymer solid.

Example 12

Oxygen Scavenging Study of CHAA Emulsion Polymer

A pre-weighed Whatman® #2 qualitative filter paper (2.25 g) was dipped into a toluene solution made from 0.2 g tribenzoyl triphenylbenzene (BBP[3]), 4.22 g cobalt oleate toluene (50 wt. %) solution, and 20 g toluene. The dipped paper was dried with a heat gun with low heat setting to evaporated toluene. After evaporation, about 0.25 g (cobalt oleate and BBP[3]) were deposited on the filter paper. A CHAA polymer emulsion (made according to Example 1) was sprayed on the cobalt oleate/BBP[3]-coated filter paper. The paper was again dried with a heat gun with low heat setting, to evaporate water from the emulsion. After evaporation, about 0.8 g CHAA polymer was coated on the filter paper. A portion of the coated paper (1.20 g) was cut and exposed to UV light (254 nm) for 90 sec. Oxygen scavenging was tested with 300 cc of nitrogen containing 1% $O_2$ and 99% $N_2$ at room temperature, using a Mocon HS750. The head space oxygen level dropped from 1.05% to 100 ppm after 18 hr at room temperature, and to below 20 ppm after 24 hr.

Example 13

Oxygen Scavenging Study of CHAA Emulsion Polymer

A pre-weighed Whatman® #2 qualitative filter paper (2.60 g) was dipped into a toluene solution made from 0.2 g of BBP[3], 4.22 g of cobalt oleate toluene (50 wt. %) solution and 100 g of toluene. The dipped paper was dried with a heat gun with low heat setting to evaporate toluene. Less then 0.05 g (cobalt oleate and BBP[3]) were deposited on the filter paper. A CHAA polymer emulsion (made according to Example 1) was sprayed on the cobalt oleate/BBP[3]-coated filter paper. The paper was again dried with a heat gun with low heat setting, to evaporate water. About 0.85 g CHAA polymer was coated on the filter paper. A portion of the coated paper (1.00 g) was cut and exposed to UV light (254 nm) for 90 sec. Oxygen scavenging was tested with 300 cc nitrogen containing 1% $O_2$ and 99% $N_2$ at room temperature, using a Mocon HS750. The head space oxygen level dropped from 1.05% to below 100 ppm after 24 hr at room temperature.

Example 14

Oxygen Scavenging Study of CHAA Emulsion Polymer

The emulsion-coated paper made in Example 13 (1.00 g) was used without UV activation. Oxygen scavenging was tested with 300 cc nitrogen containing 1% $O_2$ and 99% $N_2$ at room temperature, using a Mocon HS750. The head space oxygen level dropped from 1.01% to below 100 ppm after 24 hr at room temperature.

Example 15

Oxygen Scavenging Study of CHAA Emulsion Polymer

A pre-weighed Whatman® #2 qualitative filter paper (2.60 g) was dipped into a toluene solution made from 0.5 g cobalt stearate and 100 g toluene. The dipped paper was dried in a vacuum oven at 50° C. under house vacuum (26 in Hg) for 20 min. Less then 0.05 g cobalt stearate was deposited on the filter paper. A CHAA polymer emulsion (made according to Example 1) was sprayed on the cobalt stearate-coated filter paper. The paper was again dried in a vacuum oven for 2.5 hrs. About 1.1 g CHAA polymer was coated on the filter paper. Oxygen scavenging was tested with 300 cc nitrogen containing 1% $O_2$ and 99% $N_2$ at room temperature on the coated paper (1.2 g) without UV activation. The head space oxygen level dropped from 1.05% to below 0.49% after 24 hr at room temperature, and less than 100 ppm after 91 hr.

Example 16

Oxygen Scavenging Study of CHAA/Methyl Acrylate Emulsion Copolymer

Figure 1:
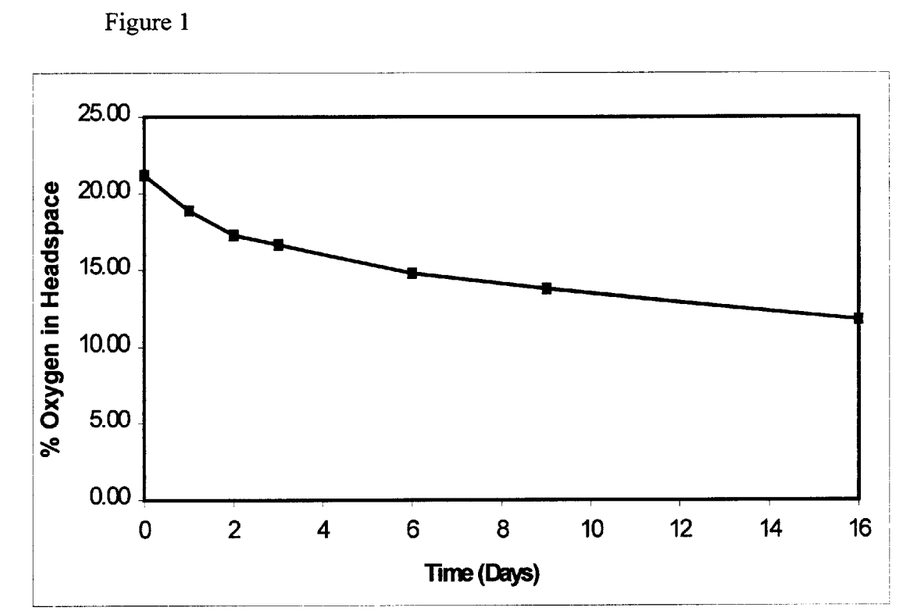
FIG. 1 shows the variation of head space oxygen level with time in a test of an emulsion coated paper (1.29 g) made according to Example 15 and coated with 0.78 g cyclohexenyl methyl acrylate/methyl acrylate copolymer (made according to Example 3). Oxygen scavenging was tested with 300 cc air (21% $O_2$) at room temperature on the coated paper without UV activation.

An emulsion coated paper (1.29 g) was made similarly to that of Example 15 and containing 0.78 g CHAA/methyl acrylate copolymer (made according to Example 3). Oxygen scavenging was tested with 300 cc air (21% $O_2$) at room temperature on the coated paper without UV activation. FIG. 1 shows the variation of head space oxygen level with time.

Example 17

Oxygen Scavenging Study of CHAA/Vinyl Acetate Emulsion Copolymer

Figure 2:
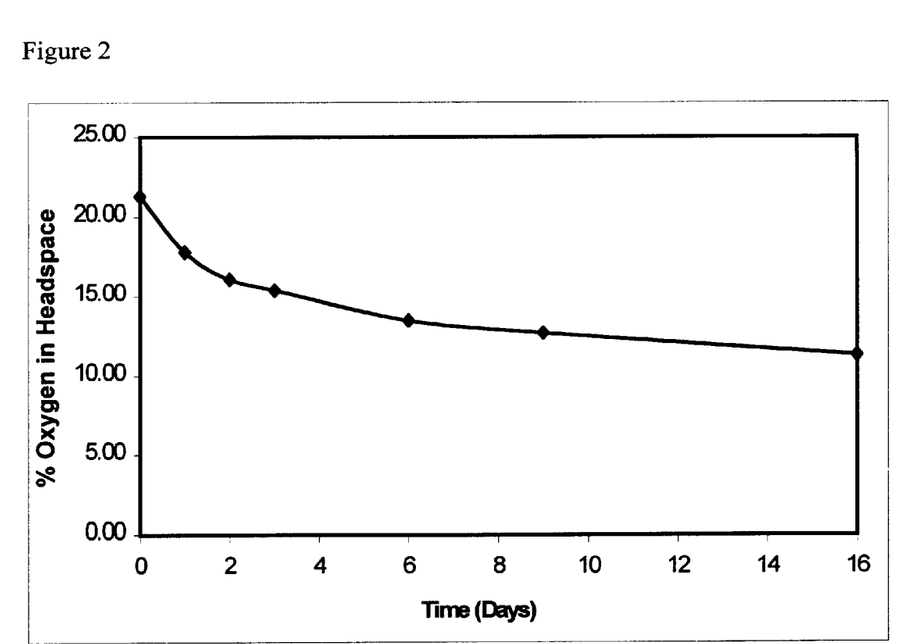
FIG. 2 shows the variation of head space oxygen level with time in a test of an emulsion coated paper (0.87 g) made according to Example 15 and coated with 0.37 g cyclohexenyl methyl acrylate/vinyl acetate copolymer made according to Example 11. Oxygen scavenging was tested with 300 cc air (21% O2) at room temperature on the coated paper without UV activation.

An emulsion coated paper (0.87 g) was made according to Example 15. The paper was coated with 0.37 g CHAA/vinyl acetate copolymer made according to Example 11. Oxygen scavenging was tested with 300 cc air (21% $O_2$) at room temperature on the coated paper without UV activation. FIG. 2 shows the variation of head space oxygen level with time.

Example 18

Oxygen Scavenging Study of CHAA/Vinyl Acetate Emulsion Copolymer

Figure 3:
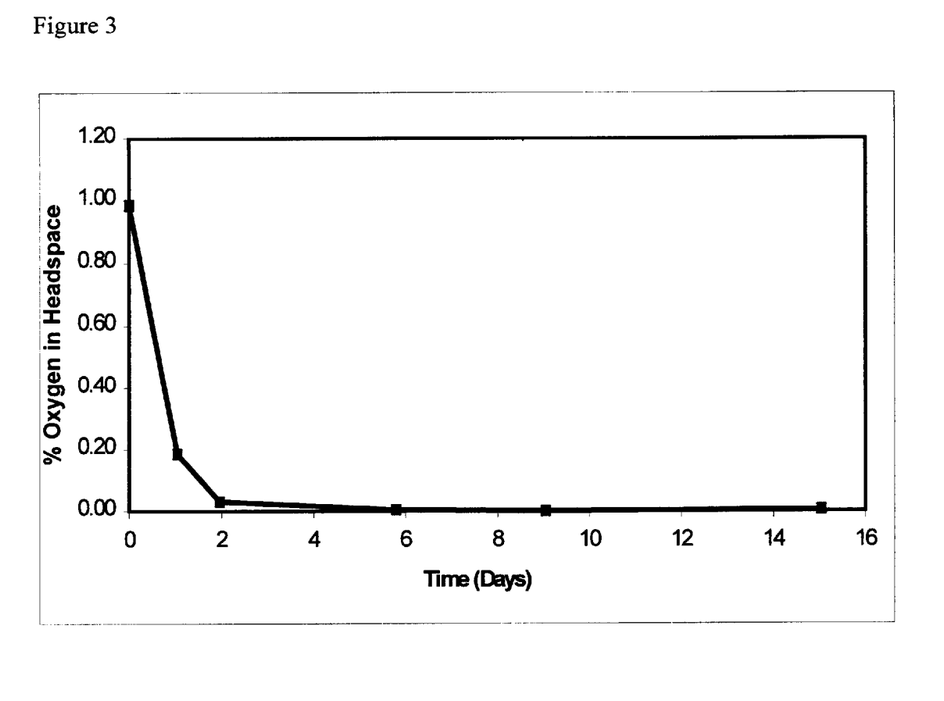
FIG. 3 shows the variation of head space oxygen level with time in a test of an emulsion coated paper (0.88 g) made according to Example 15 and coated with 0.35 g cyclohexenyl methyl acrylate/vinyl acetate copolymer made according to Example 11. Oxygen scavenging was tested with 300 cc nitrogen containing 1% $O_2$ and 99% $N_2$ at room temperature on the coated paper without UV activation.

An emulsion coated paper (0.88 g) was made according to Example 15, and contained 0.35 g CHAA/vinyl acetate copolymer made according to Example 11. Oxygen scavenging was tested with 300 cc nitrogen containing 1% $O_2$ and 99% $N_2$ at room temperature on the coated paper without UV activation. FIG. 3 shows the variation of head space oxygen level with time.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A crosslinked oxygen scavenging polymer, comprising structure I:

(I)

wherein R is selected from the group consisting of —H and —$CH_3$; $R^1$ and $R^2$ are each selected from —H, —$CH_3$, or a monomeric unit of a polymer wherein the monomeric unit comprises an ethylenic backbone and a cyclic hydrocarbon pendant group, provided at least one of $R^1$ and $R^2$ is the monomeric unit; M is —($CR^3{}_2$)$_n$—, wherein n is an integer from 0 to 4, inclusive; X is null or a linking group; and each $R^3$ is independently selected from —H or —$CH_3$; and the mole fraction of crosslinked groups is less than about 10 mol %;

an ethylenic backbone; and a pendant or terminal cyclic olefinic group with structure II:

(II)

wherein $q_1$, $q_2$, $q_3$, $q_4$, and r are independently selected from hydrogen, methyl, or ethyl; m is —($CH_2$)$_n$—, wherein n is an integer from 0 to 4, inclusive; X is null or a linking group; and, when r is hydrogen, at least one of $q_1$, $q_2$, $q_3$, and $q_4$ is also hydrogen.

2. An emulsion, comprising:

an oxygen scavenging polymer, water, and a surfactant, wherein the polymer is crosslinked and comprises structure I:

(I)

wherein R is selected from the group consisting of —H and —$CH_3$; $R^1$ and $R^2$ are each selected from —H, —$CH_3$, or a monomeric unit of a polymer wherein the monomeric unit comprises an ethylenic backbone and a cyclic hydrocarbon pendant group, provided at least one of $R^1$ and $R^2$ is the monomeric unit; M is $-(CR^3_2)_n-$, wherein n is an integer from 0 to 4 inclusive; X is null or a linking group; and each $R^3$ is independently selected from —H or —$CH_3$, wherein the mole fraction of crosslinked groups is less than about 10 mol %, an ethylenic backbone and a pendant or terminal cyclic olefinic group with structure II:

(II)

wherein $q_1$, $q_2$, $q_3$, $q_4$, and r are independently selected from hydrogen, methyl, or ethyl; m is $-(CH_2)_n-$, wherein n is an integer from 0 to 4, inclusive; X is null or a linking group; and, when r is hydrogen, at least one of $q_1$, $q_2$, $q_3$, and $q_4$ is also hydrogen.

3. The emulsion of claim 2, wherein the emulsion is substantially free of organic solvent.

4. A method of forming an oxygen scavenging packaging article comprising two adhered surfaces, comprising:

providing a packaging article comprising two surfaces which are desired to be adhered;

applying an emulsion comprising crosslinked oxygen scavenging polymer comprising structure I:

(I)

wherein R is selected from the group consisting of —H and —$CH_3$; $R^1$ and $R^2$ are each selected from —H, —$CH_3$, or a monomeric unit of a polymer wherein the monomeric unit comprises an ethylenic backbone and a cyclic hydrocarbon pendant group, provided at least one of $R^1$ and $R^2$ is the monomeric unit; M is $-(CR^3_2)_n-$, wherein n is an integer from 0 to 4, inclusive; X is null or a linking group; and each $R^3$ is independently selected from —H or —$CH_3$, wherein the mole fraction of crosslinked groups is less than about 10 mol %, an ethylenic backbone and a pendant or terminal cyclic olefinic group with structure II:

(II)

wherein $q_1$, $q_2$, $q_3$, $q_4$, and r are independently selected from hydrogen, methyl, or ethyl; m is $-(CH_2)_n-$, wherein n is an integer from 0 to 4, inclusive; X is null or a linking group; and, when r is hydrogen, at least one of $q_1$, $q_2$, $q_3$, and $q_4$ is also hydrogen, water, and a surfactant to at least one of the two surfaces of the packaging article, to form an emulsion-coated surface;

contacting the two surfaces which are desired to be adhered; and evaporating water from the emulsions-coated surface, to adhere the two surfaces and form the oxygen scavenging packaging article.

5. The emulsion of claim 2, wherein $q_1$, $q_2$, $q_3$, $q_4$, and r are each hydrogen and n is 1 in both M and m.

6. The emulsion of claim 2, wherein X is a linking group selected from:

wherein $R^4$ is hydrogen, methyl, ethyl, propyl, or butyl; and y is an integer from 1 to 18, inclusive.

7. The emulsion of claim 6, wherein the polymer comprises cyclohexenylmethyl acrylate (CHAA) units or cyclohexenylmethyl methacrylate (CHMA) units.

8. The emulsion of claim 2, wherein the polymer content is from about 5 wt % to about 65 wt %.

9. The emulsion of claim 8, wherein the polymer content is from about 20 wt % to about 65 wt %.

10. The emulsion of claim 2, wherein the emulsion further comprises less than about 500 ppm monomer.

11. The emulsion of claim 2, wherein the surfactant is selected from an ionic surfactant or a non-ionic surfactant.

12. The emulsion of claim 11, wherein the ionic surfactant is sodium lauryl sulfate and the nonionic surfactant is selected from nonyl phenol ethoxylate or an alkylarylpolyether sulfonate.

13. The emulsion of claim 2, wherein the surfactant content is from about 0.1 wt % to about 1.5 wt %.

14. The emulsion of claim 2, further comprising an initiator product.

15. The emulsion of claim 14, wherein the initiator product is selected from $K_2SO_4$ or $(NH_4)_2SO_4$.

16. An oxygen scavenging packaging article, comprising:

a structural layer, and a polymer coating comprising an oxygen scavenging polymer and a surfactant, wherein the polymer is crosslinked and comprises structure I:

wherein R is selected from the group consisting of —H and —CH$_3$; R$^1$ and R$^2$ are each selected from —H, —CH$_3$, or a monomeric unit of a polymer wherein the monomeric unit comprises an ethylenic backbone and a cyclic hydrocarbon pendant group, provided at least one of R$^1$ and R$^2$ is the monomeric unit; M is —(CR$^3$$_2$)$_n$—, wherein n is an integer from 0 to 4, inclusive; X is null or a linking group; and each R$^3$ is independently selected from —H or —CH$_3$, wherein the mole fraction of crosslinked groups is less than about 10 mol %, an ethylenic backbone
and a pendant or terminal cyclic olefinic group with structure II:

wherein q$_1$, q$_2$, q$_3$, q$_4$, and r are independently selected from hydrogen, methyl, or ethyl; m is —(CH$_2$)$_n$—, wherein n is an integer from 0 to 4, inclusive; X is null or a linking group; and, when r is hydrogen, at least one of q$_1$, q$_2$, q$_3$, and q$_4$ is also hydrogen.

17. The oxygen scavenging packaging article of claim 16, wherein q$_1$, q$_2$, q$_3$, q$_4$, and r are each hydrogen and n is 1 in both M and m.

18. The oxygen scavenging packaging article of claim 16, wherein X is a linking group selected from:

wherein R$^4$ is hydrogen, methyl, ethyl, propyl, or butyl; and y is an integer from 1 to 18, inclusive.

19. The oxygen scavenging packaging article of claim 18, wherein the polymer comprises cyclohexenylmethyl acrylate (CHAA) monomer units or cyclohexenylmethyl methacrylate (CHMA) monomer units.

20. The oxygen scavenging packaging article of claim 16, wherein the oxygen scavenging coating comprises less than 30 ppm monomer.

21. The oxygen scavenging packaging article of claim 16, wherein the surfactant is selected from an ionic surfactant or a non-ionic surfactant.

22. The oxygen scavenging packaging article of claim 21, wherein the ionic surfactant is sodium lauryl sulfate and the nonionic surfactant is selected from nonyl phenol ethoxylate or an alkylarylpolyether sulfonate.

23. The oxygen scavenging packaging article of claim 16, wherein the structural layer comprises a structural material selected from polyethylene, low density polyethylene, very low density polyethylene, ultra-low density polyethylene, high density polyethylene, polyethylene terephthalate (PET), polyvinyl chloride, ethylene-vinyl acetate, ethylene-alkyl (meth)acrylates, ethylene-(meth)acrylic acid, ethylene-(meth)acrylic acid ionomers, silica, metal foil, glass, paperboard, or cardboard.

24. A method for preparing an emulsion comprising an oxygen scavenging polymer, water, and a surfactant, the method comprising:

providing water, the surfactant, a free radical initiator, and monomeric components of the oxygen scavenging polymer;

forming a first emulsion comprising water, the free radical initiator, and the surfactant;

adding the monomeric components to the first emulsion; and polymerizing the monomeric components at from about 60° C. to about 100° C. for from about 30 min to about 6 hr, to form the emulsion, wherein the polymer is crosslinked and comprises structure I:

wherein R is selected from the group consisting of —H and —CH$_3$; R$^1$ and R$^2$ are each selected from —H, —CH$_3$, or a monomeric unit of a polymer wherein the monomeric unit comprises an ethylenic backbone and a cyclic hydrocarbon pendant group, provided at least one of R$^1$ and R$^2$ is the monomeric unit; M is —(CR$^3$$_2$)$_n$—, wherein n is an integer from 0 to 4, inclusive; X is null or a linking group; and each R$^3$ is independently selected from —H or —CH$_3$, wherein the mole fraction of crosslinked groups is less than about 10 mol %, an ethylenic backbone
and a pendant or terminal cyclic olefinic group with structure II:

wherein q$_1$, q$_2$, q$_3$, q$_4$, and r are independently selected from hydrogen, methyl, or ethyl; m is —(CH$_2$)$_n$—, wherein n is an integer from 0 to 4, inclusive; X is null or a linking group; and, when r is hydrogen, at least one of $q_1$, $q_2$, $q_3$, and $q_4$ is also hydrogen.

25. The method of claim 24, wherein $q_1$, $q_2$, $q_3$, $q_4$, and r are each hydrogen and n is 1 in both M and m.

26. The method of claim 24, wherein X is a linking group selected from:

—O—(CHR⁴)_y—; —(C=O)—O—(CHR⁴)_y—; —NH—(CHR⁴)_y—; —O—(C=O)—(CHR⁴)_y—; —(C=O)—NH—(CHR⁴)_y—; or —(C=O)—O—CHOH—CH₂—O— wherein $R^4$ is hydrogen, methyl, ethyl, propyl, or butyl; and y is an integer from 1 to 18, inclusive.

27. The method of claim 26, wherein the polymer comprises cyclohexenylmethyl acrylate (CHAA) units or cyclohexenylmethyl methacrylate (CHMA) units.

28. The method of claim 24, wherein the polymer content of the emulsion is from about 5 wt % to about 65 wt %.

29. The method of claim 28, wherein the polymer content of the emulsion is from about 20 wt % to about 65 wt %.

30. The method of claim 24, wherein the emulsion further comprises less than about 30 ppm monomer.

31. The method of claim 24, wherein the surfactant is selected from an ionic surfactant or a non-ionic surfactant.

32. The method of claim 31, wherein the ionic surfactant is sodium lauryl sulfate and the nonionic surfactant is selected from nonyl phenol ethoxylate or an alkylarylpolyether sulfonate.

33. The method of claim 24, wherein the surfactant content of the emulsion is from about 0.1 wt % to about 1.5 wt %.

34. The method of claim 24, wherein the free radical initiator is selected from potassium persulfate or ammonium persulfate.

35. The method of claim 24, wherein the adding step comprises adding a second emulsion comprising water, the free radical initiator, the surfactant, and the monomeric components to the first emulsion.

36. The method of claim 24, wherein the adding step comprises adding the monomeric components as a substantially pure feed to the first emulsion.

37. A method of forming an oxygen scavenging packaging article, comprising:

providing a packaging article;

applying an emulsion comprising crosslinked oxygen scavenging polymer comprising structure I:

(I)

wherein R is selected from the group consisting of —H and —CH₃; $R^1$ and are $R^2$ each selected from —H, —CH₃, or a monomeric unit of a polymer wherein the monomeric unit comprises an ethylenic backbone and a cyclic hydrocarbon pendant group, provided at least one of $R^1$ and $R^2$ is the monomeric unit; M is —(CR³₂)_n—, wherein n is an integer from 0 to 4, inclusive; X is null or a lining group; and each $R^3$ is independently selected from —H or —CH₃, wherein the mole fraction of crosslinked groups is less than about 10 mol %, an ethylenic backbone and a pendant or terminal cyclic olefinic group with structure II:

(II)

wherein $q_1$, $q_2$, $q_3$, $q_4$, in r are independently selected from hydrogen methyl, or ethyl; m is —(CH₂)_n—, wherein n is an integer from 0 to 4, inclusive; X is null or a linking group; and, when r is hydrogen, at least one of $q_1$, $q_2$, $q_3$, $q_4$ is also hydrogen, water, and a surfactant to at least one surface of the packaging article, to form an emulsion-coated surface; and evaporating water from the emulsion-coated surface, to form the oxygen scavenging packaging article.

38. The method of claim 37, wherein the coating is performed by pouring, immersing, or spraying.

39. The method of claim 4, wherein the coating is performed by pouring, immersing, or spraying.

* * * * *

UNITED STATES PATENT AND TRADEMARK OFFICE
CERTIFICATE OF CORRECTION

PATENT NO.    : 6,515,067 B2
DATED         : February 4, 2003
INVENTOR(S)   : Gangfeng Cai et al.

It is certified that error appears in the above-identified patent and that said Letters Patent is hereby corrected as shown below:

Column 20,
Line 24, delete "emulsions-coated" and insert -- emulsion-coated --.

Column 24,
Line 15, delete "are $R^2$" and insert -- $R^2$ are --.
Line 21, delete "lining" and insert -- linking --.
Line 39, delete "in" and insert -- and --.
Line 40, insert a -- , -- after "hydrogen".
Line 43, insert -- and -- between "q3, q4".

Signed and Sealed this

Third Day of June, 2003

JAMES E. ROGAN
*Director of the United States Patent and Trademark Office*